United States Patent
Odendall

(10) Patent No.: US 7,785,540 B2
(45) Date of Patent: Aug. 31, 2010

(54) EXHAUST EMISSION CONTROL DEVICE

(75) Inventor: Bodo Odendall, Lenting (DE)

(73) Assignee: Audi AG, Ingolstadt (DE)

( * ) Notice: Subject to any disclaimer, the term of this patent is extended or adjusted under 35 U.S.C. 154(b) by 671 days.

(21) Appl. No.: 11/882,258

(22) Filed: Jul. 31, 2007

(65) Prior Publication Data

US 2008/0028756 A1 Feb. 7, 2008

(30) Foreign Application Priority Data

Aug. 2, 2006 (DE) ........................ 10 2006 036 056

(51) Int. Cl.
  *B01J 19/00* (2006.01)
  *F01N 3/10* (2006.01)
  *F01N 3/00* (2006.01)
(52) U.S. Cl. ........................ 422/108; 422/169; 422/171; 60/285; 60/297; 60/301
(58) Field of Classification Search ................. 422/108, 422/169, 171; 60/285, 297, 301
See application file for complete search history.

(56) References Cited

U.S. PATENT DOCUMENTS 6,220,018 B1 * 4/2001 Yamanashi et al. ............. 60/285
6,446,429 B2 * 9/2002 Kobayashi et al. ............. 60/285
6,571,550 B2 * 6/2003 Rosel et al. .................... 60/285
6,976,355 B2 * 12/2005 Imada et al. ................... 60/285
2002/0040578 A1 * 4/2002 Rosskamp et al. ............. 60/299

FOREIGN PATENT DOCUMENTS

DE 196 40 161 A1 4/1998

* cited by examiner

*Primary Examiner*—N. Bhat
(74) *Attorney, Agent, or Firm*—Novak Druce + Quigg

(57) ABSTRACT

For an exhaust emission control device of an internal combustion engine with a support which has a catalytically active coating for absorbing oxygen ($O_2$) in the reduction of the exhaust gas and for releasing oxygen in the oxidation of the exhaust gas, it is proposed that the catalytically active coating comprises different materials (A, B, C) which can store oxygen and which each form a component storage unit (MA, MB, MC) for the oxygen ($O_2$), the first material (A) at lambda $\lambda<1$ changing its oxidation stage and constituting a first component storage unit (MA) for oxygen ($O_2$), the second material (B) at lambda $\lambda=1$ changing its oxidation stage and constituting a second component storage unit (MB) for oxygen ($O_2$), and the third material (C) at lambda $\lambda>1$ changing its oxidation stage and constituting a third component storage unit (MC) for oxygen ($O_2$).

8 Claims, 2 Drawing Sheets

EXHAUST EMISSION CONTROL DEVICE

CROSS-REFERENCE TO RELATED APPLICATIONS

This application claims priority from German Application No. 102006036056.7 filed Aug. 2, 2006, hereby incorporated by reference in its entirety.

This invention relates to an exhaust emission control device of an internal combustion engine with a support structure which has a catalytically active coating for absorbing oxygen in the reduction of the exhaust gas and for releasing oxygen in the oxidation of the exhaust gas.

BACKGROUND OF THE INVENTION

Known three-way catalytic converters with good activity and endurance use one or more catalytic components from the platinum group metals, such as platinum, palladium, or rhodium which have been deposited on a refractory oxide carrier, for example aluminum oxide with a high surface. They are conventionally applied in the form of a thin layer or coating to a suitable carrier or a suitable substrate such as a refractory ceramic or metal honeycomb structure. In this connection the demand for improved catalyst activity and service life has led to complex catalytic converter designs which comprise several catalyst layers on support structures, each of the layers containing selected carrier materials and catalytic components and so-called promoters, stabilizers and oxygen storage compounds.

Document DE 501 06 490 T2 discloses an economical, single-layer, high performance three-way catalytic converter which contains a catalytic coating with platinum, rhodium and various oxide materials on an inert carrier. In this connection platinum promotes the oxidation of hydrocarbons and carbon monoxide, while rhodium promotes the reduction of nitrogen oxides.

Against this background, the object of the invention is to design an improved device for exhaust emission control in an internal combustion engine which ensures, in case of a fault, that the oxygen storage unit of the catalytically active coating for exhaust emission control can still adequately absorb or release oxygen.

SUMMARY OF THE INVENTION

The object is achieved by the catalytically active coating comprising different materials which can store oxygen and which each form a component storage unit for the oxygen, the first material at lambda $\lambda<1$ changing its oxidation stage and constituting a first component storage unit for oxygen, the second material at lambda $\lambda=1$ changing its oxidation stage and constituting a second component storage unit for oxygen, and the third material at lambda $\lambda>1$ changing its oxidation stage and constituting a third component storage unit for oxygen. A "fault" has the following effect by different component storage units being formed for differently positioned oxidation stages.

In a supplied lean air/fuel mixture a downstream lambda probe which responds exactly at lambda $\lambda=1$ shows that the second component storage unit is completely filled with oxygen, conversely the third component storage unit can continue to absorb oxygen. And for a supplied rich air/fuel mixture a downstream lambda probe which responds exactly at lambda $\lambda=1$ shows that the second component storage unit is completely emptied of oxygen, conversely the first component storage unit can continue to release oxygen.

This means that after response of the lambda probe the third component storage unit or the first component storage unit is available as a "buffer" and depending on the requirements can continue to absorb or release oxygen. Thus there is a time delay between the response of the lambda probe and the steeply running onset of conversion which takes place only after complete filling of the third component storage unit or only after complete emptying of the first component storage unit. This delay is of special importance against the background of exhaust gas legislation which is becoming more and more strict. This is due to the fact that in this way lambda control of the internal combustion engine has enough opportunity to react before conversion of the catalytic converter according to the invention dramatically degrades. Consequently improved control of the air/fuel mixture supplied to the internal combustion engine can be implemented and effective exhaust emission control is always ensured. Moreover, economical binary jump probes can be used as lambda probes.

According to one preferred embodiment a predetermined total amount of oxygen can be absorbed or released by the materials which can store oxygen, the first component storage unit formed from the first material being able to absorb or release approximately 1/6 of the total amount of oxygen, the second component storage unit formed from the second material being able to absorb or release approximately 4/6 of the total amount of oxygen, and the third component storage unit formed from the third material being able to absorb or release approximately 1/6 of the total amount of oxygen. This means that the second component storage unit formed from the second material due to its size is regarded more or less as the primary storage unit and the other two component storage units are regarded as smaller buffer storage units. Here it is not critical that the two smaller buffer storage units have the same size, since the ability to absorb oxygen during reduction and the ability to release oxygen during oxidation can differ distinctly from one another depending on the materials used for the first component storage unit and the third component storage unit.

Advantageously the materials of the catalytically active coating which are able to store oxygen are attached on different regions of the support. This is an especially good idea for a multilayer, catalytically active coating which can then be applied very specifically.

Additionally or alternatively the materials of the catalytically active coating which are able to store oxygen are mixed with one another and at least partially attached to the same regions of the support. This is used preferably in a single-layer, catalytically active coating.

The first material for the first component storage unit can be a cerium oxide which changes its oxidation stage ideally at lambda $\lambda=0.99$ or still farther below this value and can absorb or release oxygen according to the following chemical structural formula:

$$CeO_x+(2-x)/2 O_2 \Leftrightarrow CeO_2$$

The second material for the second component storage unit can be cerium oxide or zirconium cerium oxide which changes its oxidation stage ideally at lambda $\lambda=1.00$ and can absorb or release oxygen according to the following chemical structural formulas:

$$2CeO_2+0.5 O_2 \Leftrightarrow Ce_2O_3$$

$$Zr_{(1-z)}Ce_zO_{(2-zy)}+zy/2 O_2 \Leftrightarrow Zr_{(1-z)}Ce_zO_2$$

And the third material for the third storage unit can be palladium or rhodium, that is, a metal from the platinum family which changes its oxidation stage preferably at lambda λ=1.01 or still farther above this value and can absorb or release oxygen according to the following chemical structural formulas:

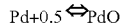

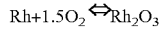

But alternatively, for the different component storage units of the device other materials which change their oxidation stage at the corresponding lambda value are also conceivable.

According to one development, in the exhaust emission control device according to the invention, it is suggested that the component storage units formed from the first and third material which can store oxygen and which change their oxidation stages at lambda λ<1.00 or at lambda λ>1.00 be dimensioned such that the amount of oxygen which is present upstream from the component storage units within the volume of the exhaust system can be absorbed or released by them. Thus, in the case of a fault the correspondingly required amount of oxygen can be absorbed or released so that in the time between the detection of the fault by a downstream single binary lambda probe and correction of the fault by a throttle valve and/or by an injection device, effective conversion of the emissions contained in the exhaust gas can continue to be done.

DETAILED DESCRIPTION OF AN EMBODIMENT OF THE INVENTION

Figure 1:
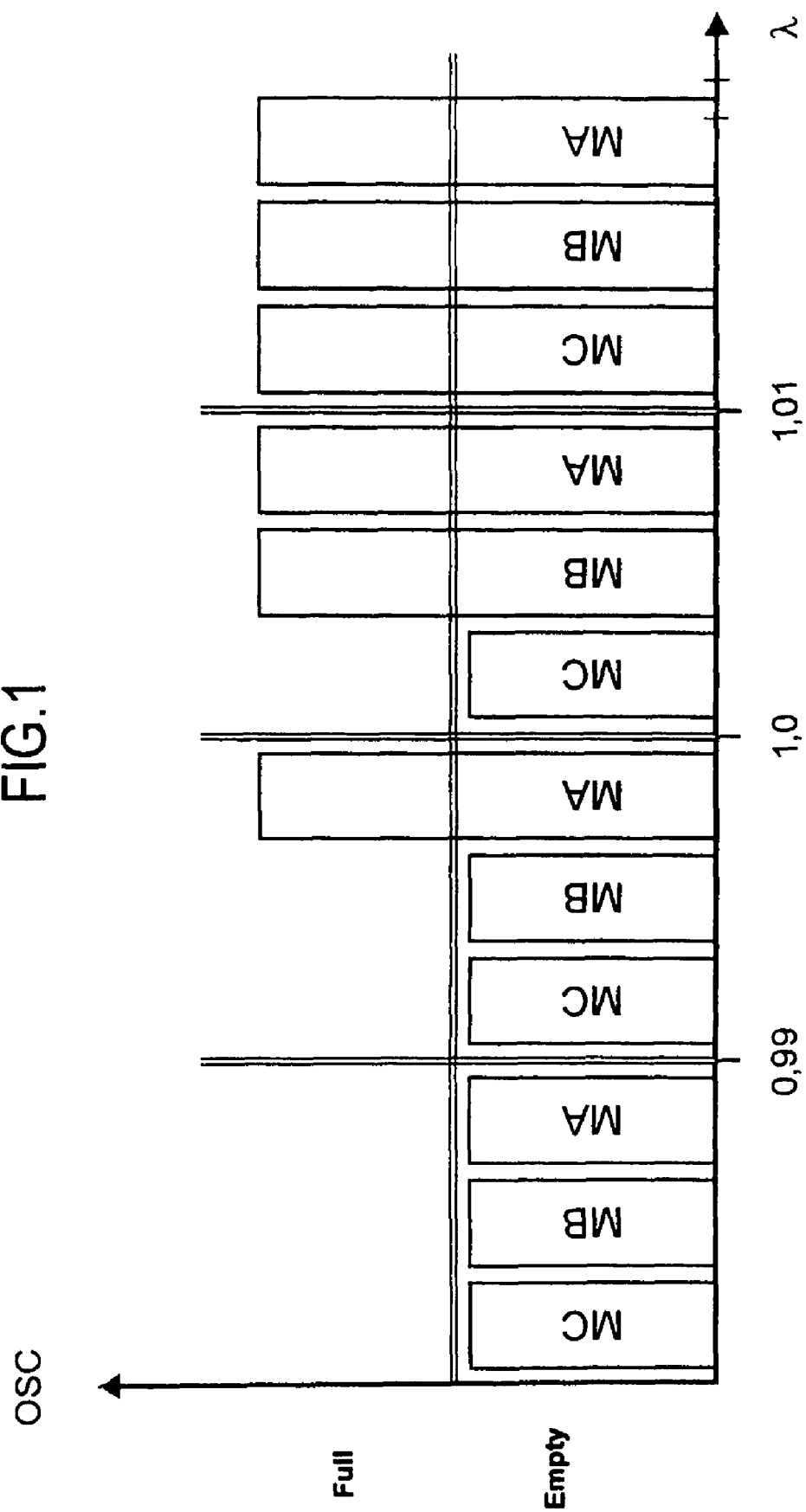
FIG. 1 shows a schematic of the oxidation stages for the various component storage units over the lambda value of the exhaust gas.

FIG. 1 schematically shows the respective change of the oxidation stages for the first material A of the first component storage unit MA, the second material B of the second component storage unit MB and the third material C of the third component storage unit MC.

The oxidation stage or crystallographic phase is changed each time when the capacity to absorb or release oxygen of the respective material A, B, C is exhausted. This means for example for the second material B cerium dioxide of the second component storage unit MB that the transition from $Ce_2O_3$ according to phase III to $CeO_2$ according to phase IV takes place when all possible lattice sites between the cerium atoms, specifically the tetrahedral gaps, are occupied by oxygen atoms. Or conversely, when all possible lattice sites between the cerium atoms are free of oxygen atoms.

It is shown in this connection that the change of the oxidation stage of the first component storage unit MA takes place starting from lambda λ=0.99; this means that this first component storage unit MA is already completely filled with oxygen, the second component storage unit MB starting from lambda λ=1.00 is then completely filled, while the third component storage unit MC is completely filled only starting from lambda λ=1.01. When the component storage units MA, MB, MC for oxygen are emptied, the behavior is exactly the opposite. First, below lambda λ=1.01 the third component storage unit MC is emptied, then below lambda λ=1.00 the second component storage unit MB is emptied, and below lambda λ=0.99 finally the first component storage unit MA.

From this behavior it can be concluded that the three component storage units MA, MB, MC are successively filled with oxygen ($O_2$) and also again successively emptied of oxygen ($O_2$); this can be advantageously used for exhaust emission control.

For this purpose the individual component storage units MA, MB, MC are dimensioned suitably so that the first component storage unit MA and the third component storage unit MC of the exhaust emission control device are dimensioned to be relatively small compared to the second component storage unit MB, so that the second component storage unit MB more or less forms the primary storage unit, while the first component storage unit MA and the third component storage unit MC form a secondary storage unit or a type of temporary pre- or post-storage unit to the primary storage unit.

Figure 2:
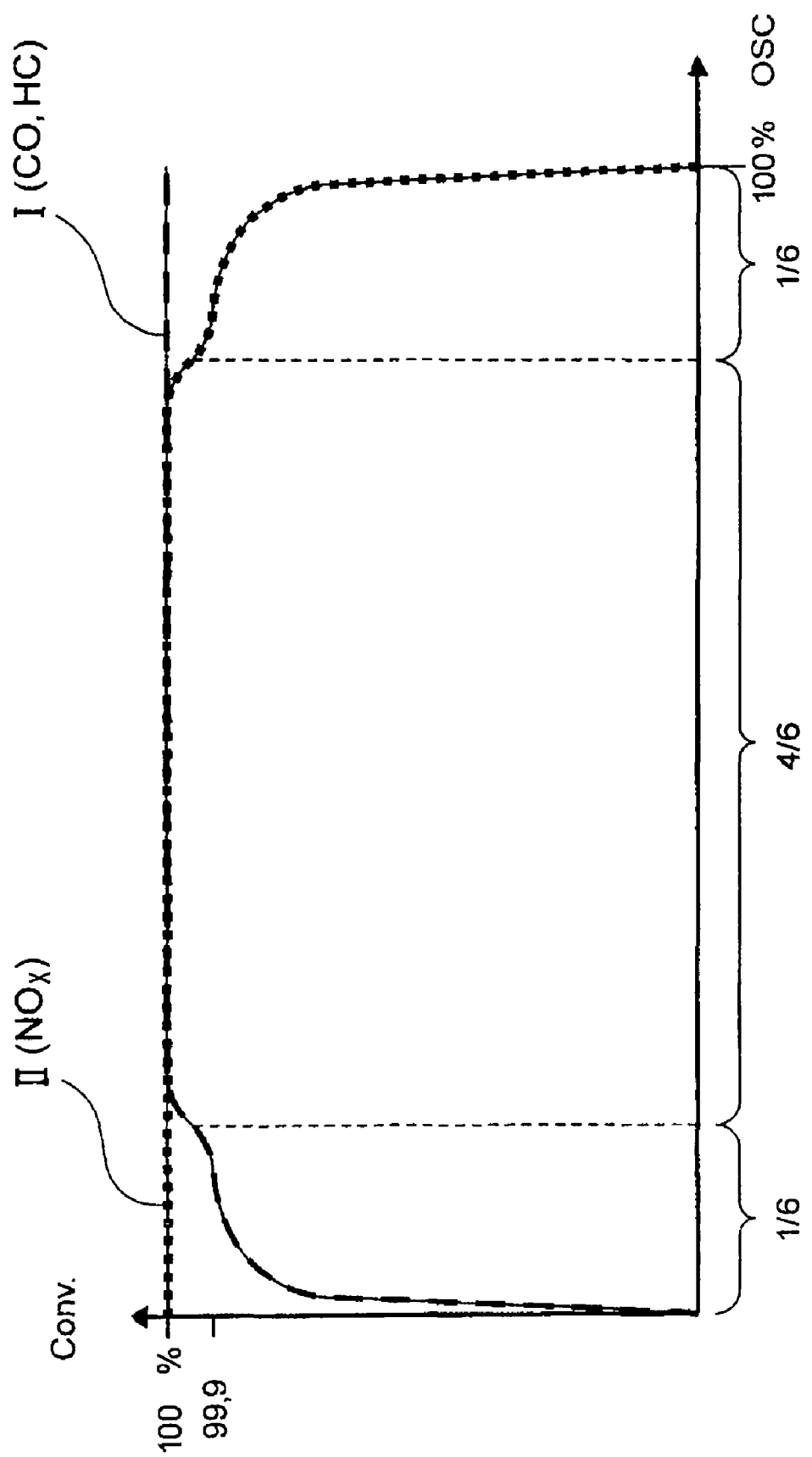
FIG. 2 shows the conversion over the oxygen loading of the component storage units of the exhaust emission control device.

In a division of the component storage units MA, MB, MC into a first component storage unit with ⅙ of the capacity of the total storage unit M for oxygen ($O_2$) and a second component storage unit MB with ⅘ of the capacity of the total storage unit M and a third component storage unit with ⅙ of the capacity of the total storage unit M as shown in FIG. 2 thus acts on the conversion of the emissions contained in the exhaust, i.e., nitrogen oxides ($NO_x$), hydrocarbons (HC) and carbon monoxide (CO).

For conversion of the nitrogen oxides ($NO_x$), oxidation takes place, oxygen ($O_2$) having to be released from the oxygen storage unit (OSC). Accordingly good conversion can only take place when the oxygen storage unit (OSC) is still sufficiently filled with oxygen ($O_2$).

And for conversion of the hydrocarbon (HC) and the carbon monoxide (CO) reduction takes place, oxygen ($O_2$) having to be absorbed by the oxygen storage unit (OSC). Thus good conversion can only take place when the oxygen storage unit (OSC) is not overly filled with oxygen.

Staggering of the filling and emptying takes place by the three component storage units MA, MB, MC as already described so that correspondingly staggered conversion of emissions is carried out as is shown in FIG. 2 according to line I for the nitrogen oxides ($NO_x$) and according to line II for the hydrocarbons (HC) and the carbon monoxides (CO).

The invention claimed is:

1. Exhaust emission control device of an internal combustion engine with a support which has a catalytically active coating for absorbing oxygen in the reduction of the exhaust gas and for releasing oxygen in the oxidation of the exhaust gas, including a lambda proble, wherein the catalytically active coating comprises different materials (A, B, C) which can store oxygen and which each form a component storage unit (MA, MB, MC) for the oxygen($O_2$), and wherein the first material (A) at lambda λ<1 changing its oxidation stage and constituting a first component storage unit (MA) for oxygen ($O_2$), the second material (B) at lambda λ=1 changing its oxidation stage and constituting a second component storage unit (MB) for oxygen ($O_2$), and the third material (C) at lambda λ>1 changing its oxidation stage and constituting a third component storage unit (MC) for oxygen ($O_2$).

2. The device according to claim 1, wherein a predetermined total amount (M) of oxygen ($O_2$) can be absorbed or released by the materials (A, B; C) which can store oxygen, and approximately ⅙ of the total amount (M) of oxygen ($O_2$) can be absorbed or released by the first component storage unit (MA) formed from the first material (A), approximately ⅘ of the total amount (M) of oxygen ($O_2$) can be absorbed or released by the second component storage unit (MB) formed from the second material (B);

and approximately ⅙ of the total amount (M) of oxygen ($O_2$) can be absorbed or released by the third component storage unit (MC) formed from the third material (C).

3. The device according to claim 1, wherein the materials (A, B, C) of the catalytically active coating which are able to store oxygen are attached on different regions of the support.

4. The device according to claim 1, wherein the materials (A, B, C) of the catalytically active coating which are able to store oxygen are mixed with one another and at, least partially attached on the same regions of the support.

5. The device according to claim 1, wherein the first material (A) is, a cerium oxide ($CeO_x$).

6. The device according to claim 1, wherein the second material (B) of the second catalytic coating is cerium oxide ($CeO_2$) or a zirconium cerium oxide ($Zr_{(1-z)}Ce_z O_{(2-zy)}$).

7. The device according to claim 1, wherein the third material (C) of the third coating is palladium (Pd) or rhodium (Rh).

8. The device according to claim 1, wherein the component storage units (MA, MC) formed from the materials (A, C) which can store oxygen and which change their oxidation stages at lambda $\lambda<1$ or at lambda $\lambda>1$ are dimensioned such that the amount of oxygen ($O_2$) which is present upstream from the component storage units (MA, MC) within the volume of the exhaust system can be absorbed or released by them.

* * * * *